US009007939B2

(12) United States Patent
Reznik et al.

(10) Patent No.: US 9,007,939 B2
(45) Date of Patent: Apr. 14, 2015

(54) METHOD AND APPARATUS FOR ENABLING SECONDARY USAGE OF LICENSED CELLULAR SPECTRUM

(75) Inventors: Alexander Reznik, Titusville, NJ (US); Amith V. Chincholi, West Babylon, NY (US); Alpaslan Demir, East Meadow, NY (US); Jean-Louis Gauvreau, La Prairie (CA); James M. Miller, Verona, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 254 days.

(21) Appl. No.: 13/514,728

(22) PCT Filed: Dec. 10, 2010

(86) PCT No.: PCT/US2010/059939
§ 371 (c)(1),
(2), (4) Date: Aug. 13, 2012

(87) PCT Pub. No.: WO2011/072251
PCT Pub. Date: Jun. 16, 2011

(65) Prior Publication Data
US 2013/0003573 A1    Jan. 3, 2013

Related U.S. Application Data

(60) Provisional application No. 61/285,749, filed on Dec. 11, 2009, provisional application No. 61/309,577, filed on Mar. 2, 2010.

(51) Int. Cl.
*H04W 16/14* (2009.01)
*H04W 24/00* (2009.01)
*H04W 72/00* (2009.01)

(52) U.S. Cl.
CPC .............. *H04W 16/14* (2013.01); *H04W 24/00* (2013.01); *H04W 72/00* (2013.01)

(58) Field of Classification Search
USPC .................................. 370/252, 315, 328, 332
See application file for complete search history.

(56) References Cited

U.S. PATENT DOCUMENTS

| 7,965,641 | B2 * | 6/2011 | Ben Letaief et al. | 370/237 |
|---|---|---|---|---|
| 2008/0159207 | A1 * | 7/2008 | Levine et al. | 370/329 |
| 2008/0165742 | A1 * | 7/2008 | Marinier et al. | 370/332 |
| 2009/0061889 | A1 * | 3/2009 | Ayoub et al. | 455/452.1 |

(Continued)

OTHER PUBLICATIONS

Simeone et al. "Spectrum Leasing to Cooperating Secondary Ad Hoc Networks," IEEE Journal on Selected Areas in Communications, vol. 26, No. 1, pp. 203-213, Jan. 2008.

(Continued)

*Primary Examiner* — Andrew Lai
*Assistant Examiner* — Andrew C Lee
(74) *Attorney, Agent, or Firm* — Condo Roccia Koptiw LLP

(57) ABSTRACT

A method and apparatus for a secondary wireless transmit/receive unit (WTRU) to use of secondary cellular spectrum are provided. The secondary WTRU monitors transmissions of a primary WTRU; determines whether to provide assistance to the primary WTRU; and in response to a determination to provide assistance, performs cooperative communications with the primary WTRU for its transmission of data to a base station. If the assistance results in the data being transmitted to the base station faster than it would have with out assistance, the secondary WTRU may utilize uplink resources originally intended for the primary WTRU.

10 Claims, 11 Drawing Sheets

(56) References Cited

U.S. PATENT DOCUMENTS

2009/0175214 A1* 7/2009 Sfar et al. .................. 370/315
2010/0120446 A1* 5/2010 Gaal .......................... 455/452.2
2011/0151887 A1* 6/2011 Hakola et al. ............. 455/452.2

OTHER PUBLICATIONS

Stanojev et al., "Spectrum Leasing via Distributed Cooperation in Cognitive Radio," Communications, 2008. ICC '08. IEEE International Conference, New Jersey Institute of Technology, Newark, New Jersey, May 19-23, 2008, pp. 3427-3431.

* cited by examiner

METHOD AND APPARATUS FOR ENABLING SECONDARY USAGE OF LICENSED CELLULAR SPECTRUM

CROSS REFERENCE TO RELATED APPLICATIONS

This application claims priority to International Application No. PCT/US2010/059939, filed Dec. 10, 2010, which claims the benefit of U.S. Provisional Patent Application No. 61/285,749 filed on Dec. 11, 2009 and U.S. Provisional Patent Application No. 61/309,577 filed on Mar. 2, 2010, the contents of which are hereby incorporated by reference herein.

BACKGROUND

Secondary usage of cellular spectrum by cognitive radio devices (CgNs) takes advantage of spectrum that would otherwise be unused by normal cellular users currently present in a cell. The cognitive usage of cellular spectrum is referred as secondary and the traditional usage is referred as primary. The secondary use problem is one of opportunistic use of available spectrum. One way this may be accomplished is passively: a secondary WTRU may observe that the spectrum is unused and may utilize the opportunity for its own communication. A second way to accomplish this is an active one: a secondary WTRU may act to create a spectrum opportunity for itself.

In the downlink transmission, the communication is under full control of the Node B (i.e., more broadly the infrastructure) and thus a secondary WTRU does not have to act on its own initiative. Transmissions to the WTRU may be scheduled in a manner consistent with its role as a secondary user (i.e., at a low priority). However, there exist opportunities for secondary mobiles to take advantages of the under utilized spectrum allocated to primary users in the uplink.

For example, the secondary usage of cellular spectrum may be transparent to primary users. The primary users may observe no degradation of service, and in the case of an actively cooperating secondary WTRU, a primary WTRU may experience a slight improvement through a reduction in latency. Accordingly, there is a need to provide a system that enables secondary usage of licensed cellular spectrum.

Background on existing cellular system is provided herein. For notational convenience the primary WTRU is referred to as a mobile station (MS) or primary WTRU. The secondary WTRU is referred to as the cognitive node (CgN) or secondary WTRU.

FIG. 1 illustrates the basic uplink traffic signaling in Long-Term Evolution (LTE) as shown in the message sequence diagram. The signal sequence along with the physical channel on which the signal is sent is shown in FIG. 1.

LTE considers three main types of uplink resource scheduling for assigning resources to a WTRU.

In dynamic scheduling, uplink (UL) resources are granted for one transmission at a time. Therefore, a WTRU may repeat scheduling requests to continue to receive UL grants to transmit data. This method provides dynamic resource allocation based on instantaneous channel conditions, however, the frequent grant requests adds a lot of signaling overhead which affects quality of service (QoS) for real time services.

Semi-persistent scheduling is a combination of dynamic and persistent scheduling. With semi-persistent scheduling, persistent scheduling may be used for new transmissions while dynamic scheduling is used for retransmissions. Semi-persistent scheduling may serve real-time applications such as voice over internet protocol (VoIP) better than the other types of scheduling. When the WTRU buffer is empty, the WTRU may send a signal to release the resource allocation.

In persistent scheduling, the UL resources are granted for repeated transmissions at specific intervals (i.e., one UL grant is valid for a series consecutive UL transmissions). For applications such as VoIP, persistent scheduling may guarantee real time service and save lots of signaling overhead. However, for every UL transmission, a retransmission opportunity has to be scheduled.

Given the numerous options for performing scheduling of UL resources, there a detailed procedure for providing spectrum access to secondary devices is needed.

SUMMARY

A method and apparatus for a secondary wireless transmit/receive unit (WTRU) to use of secondary cellular spectrum are provided. The secondary WTRU monitors transmissions of a primary WTRU; determines whether to provide assistance to the primary WTRU; and in response to a determination to provide assistance, performs cooperative communications with the primary WTRU for its transmission of data to a base station. If the assistance results in the data being transmitted to the base station faster than it would have with out assistance, the secondary WTRU may utilize uplink resources originally intended for the primary WTRU.

A secondary wireless transmit receive unit (WTRU) may also obtain use of secondary cellular spectrum by receiving a notification of secondary radio access channel (RACH) opportunity; and transmitting a request for secondary uplink resources during the secondary RACH opportunity. The notification may be included in a system information block type 2, or may be based on Boolean value received on a common control channel.

BRIEF DESCRIPTION OF THE DRAWINGS

A more detailed understanding may be had from the following description, given by way of example in conjunction with the accompanying drawings wherein.

DETAILED DESCRIPTION

Figure 1:
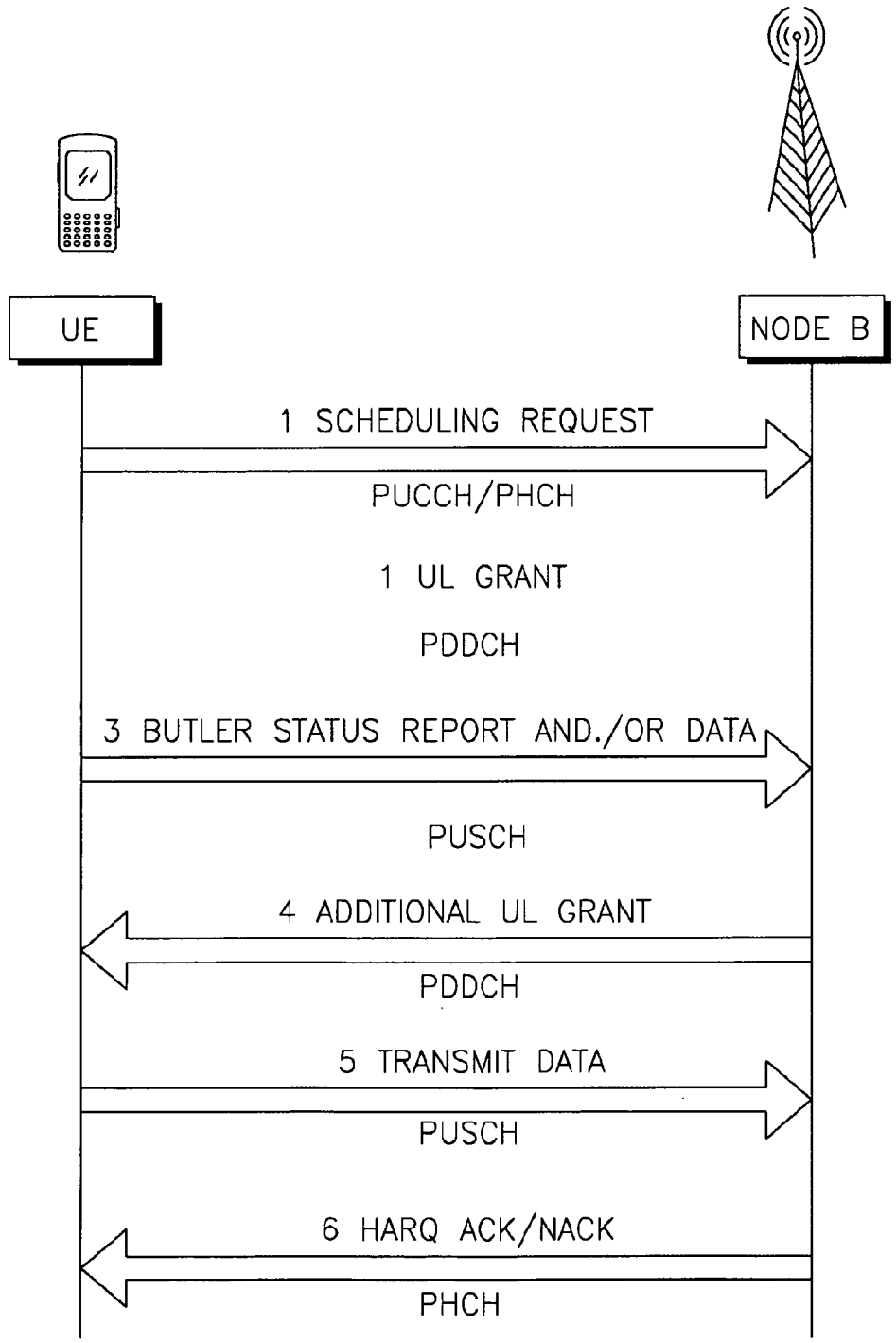
FIG. 1 is an example call flow diagram of the basic uplink traffic signaling in Long-Term Evolution (LTE)
Figure 2A:
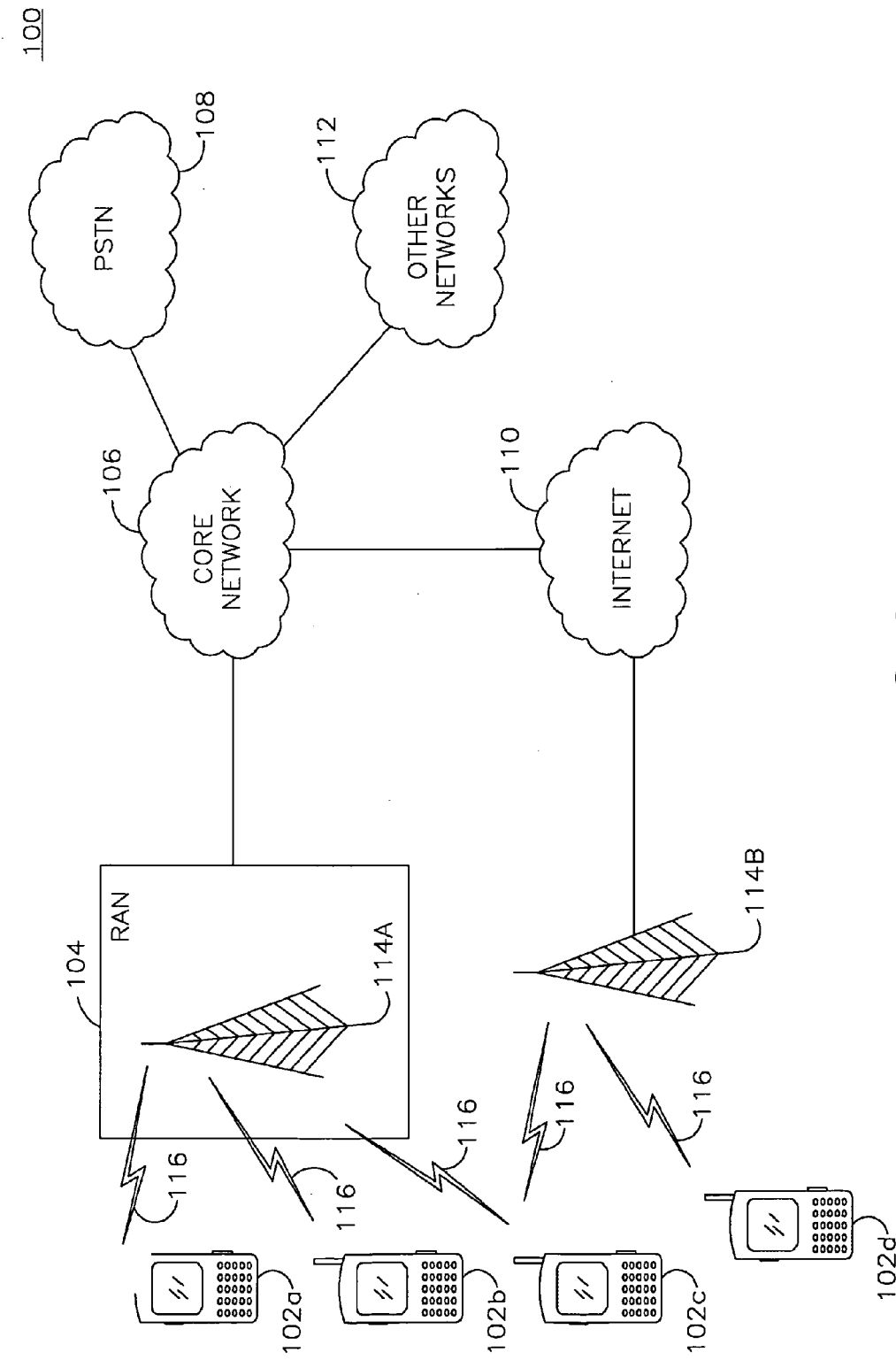
FIG. 2A is a system diagram of an example communications system in which one or more disclosed embodiments may be implemented.
Figure 2B:
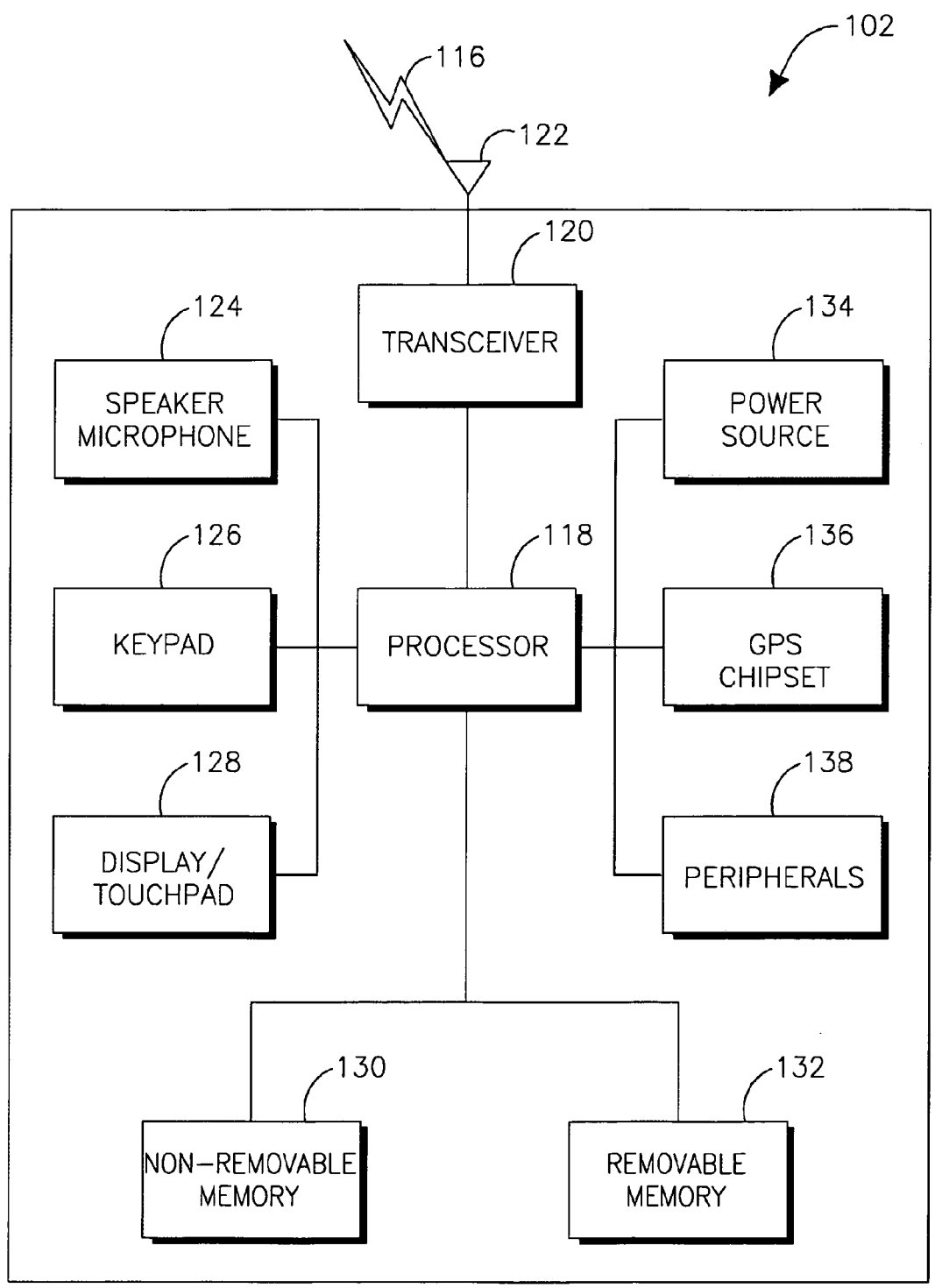
FIG. 2B is a system diagram of an example wireless transmit/receive unit (WTRU) that may be used within the communications system illustrated in FIG. 1A.
Figure 2C:
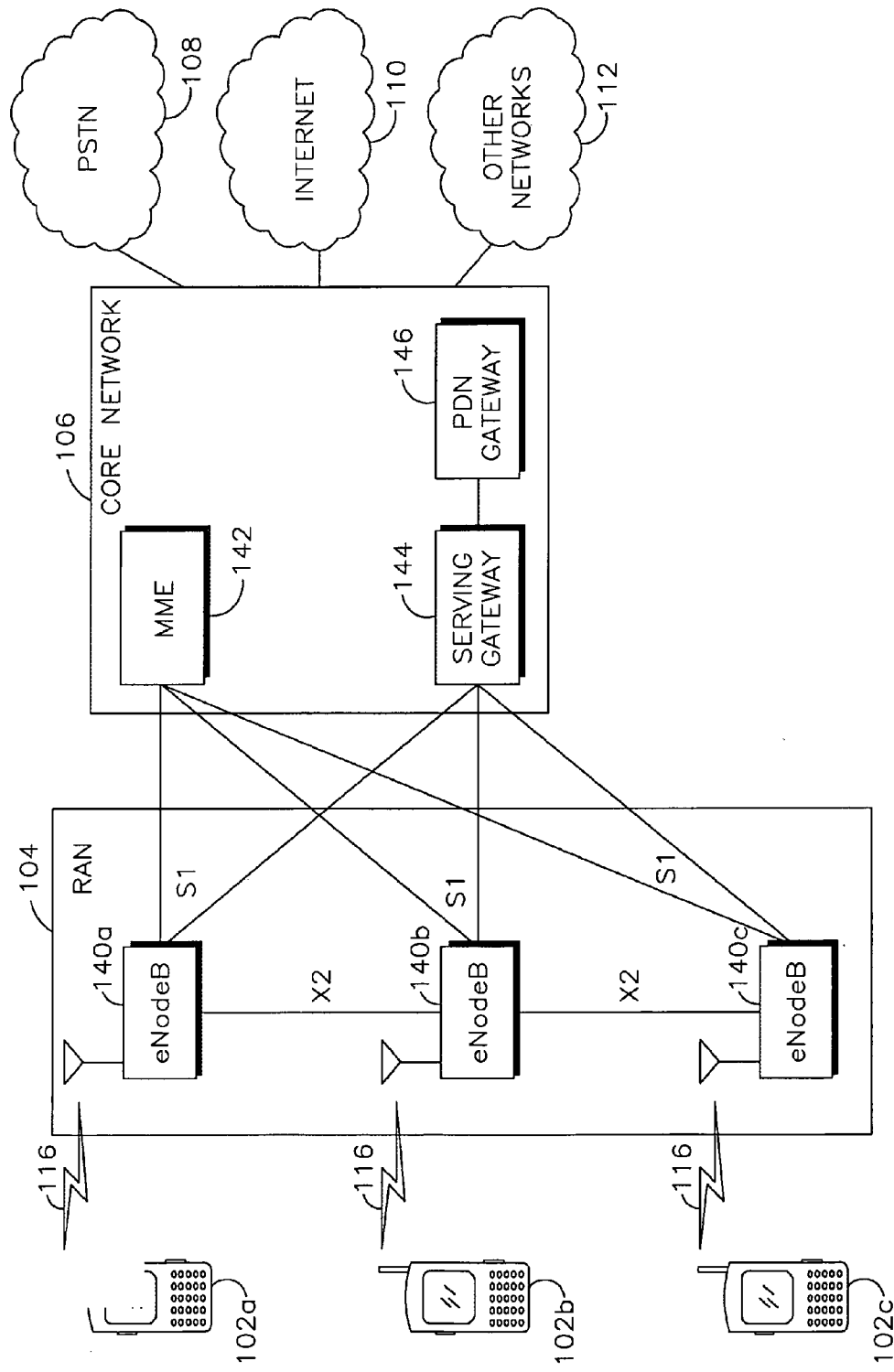
FIG. 2C is a system diagram of an example radio access network and an example core network that may be used within the communications system illustrated in FIG. 2A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a cognitive radio device (CgN) a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 3:
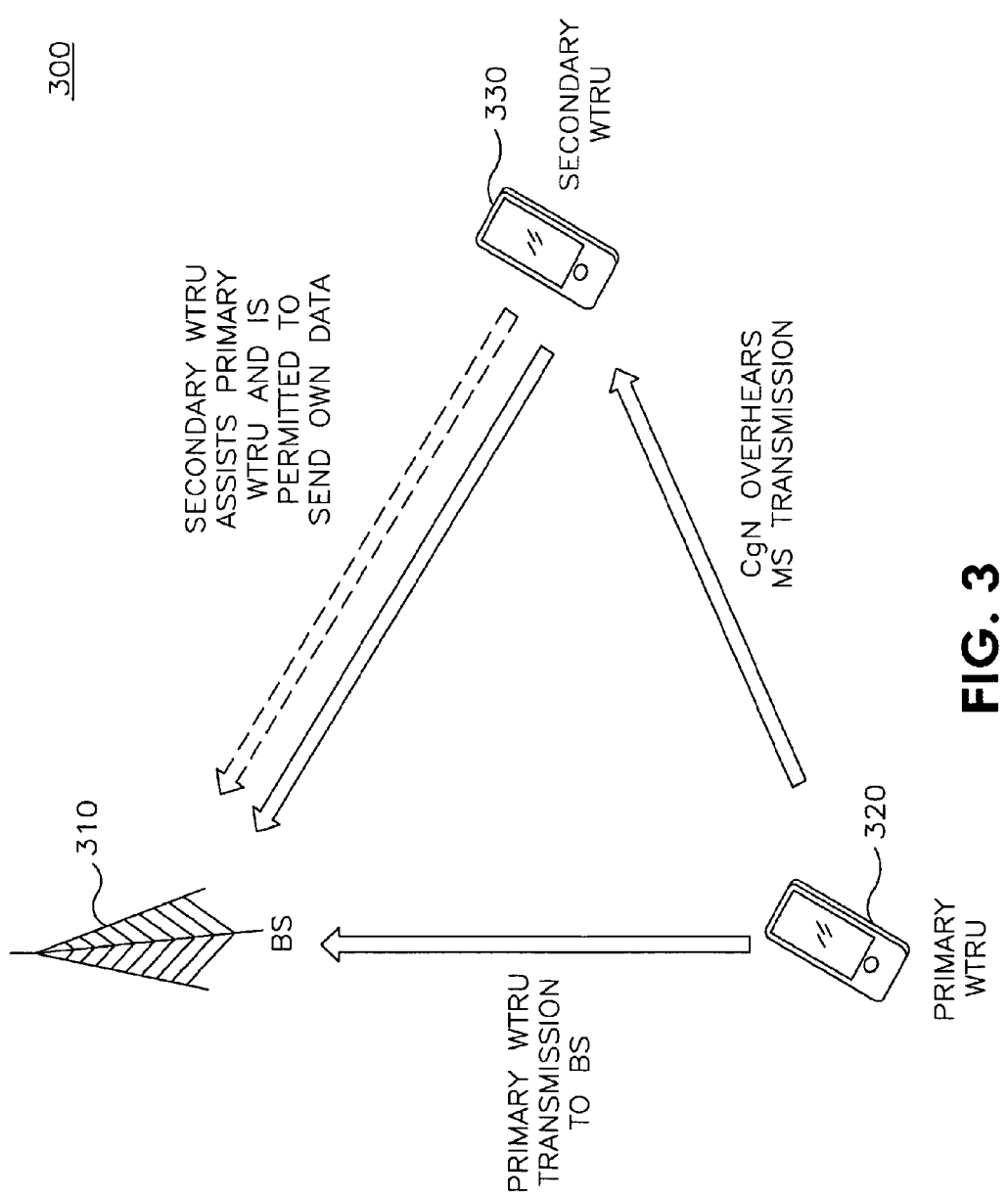
FIG. 3 is an example system diagram for an active secondary usage scenario.

FIG. 3 show an example system for an active secondary usage scenario. The system 300 includes a BS 310, a mobile station or primary WTRU 320, and a CgN or secondary WTRU 330. The secondary WTRU 330 actively creates spectrum opportunities by cooperating with a transmission from the primary WTRU 320 to the BS 310. While FIG. 3 shows only on of each entity, it should be understood that there may be multiple primary WTRUs 320, multiple secondary WTRUs 330, and multiple BSs 310. Further, it is even possible for a primary WTRU to act as a secondary WTRU and visa versa depending on the context of the communication.

The secondary WTRU 330 learns of an impending or ongoing transmission by the primary WTRU 320. Then the secondary WTRU 330 may negotiate with the primary WTRU 320 and the BS 310 to cooperate. Finally, as a result of the cooperation the secondary WTRU 330 is allowed some spectrum to transmit to the BS 310 during. The negotiation between the secondary WTRU 330 and the BS 310 should be reduced in order to avoid a prohibitive delay or prohibitive communication overhead. Negotiations between the primary WTRU 320 and secondary WTRU 330 should be avoided, if possible. In order to minimize the negotiation required, two different approaches are proposed.

Figure 4:
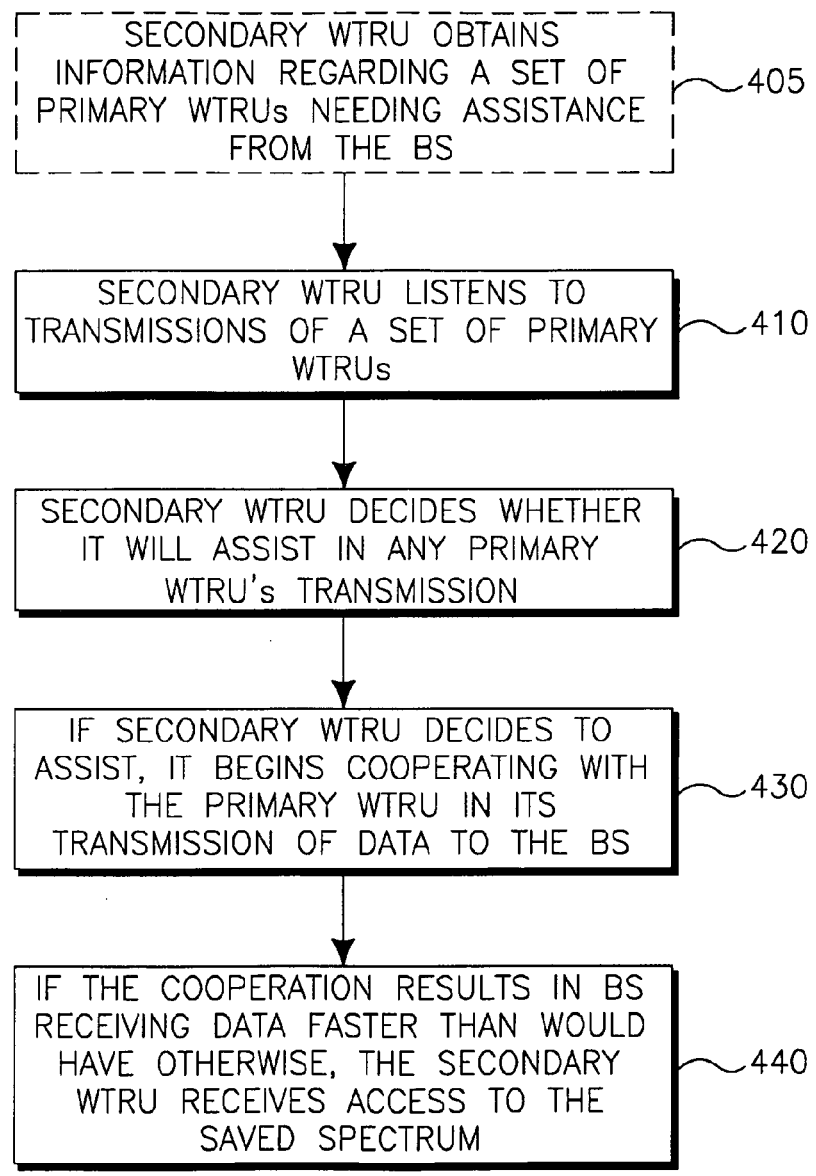
FIG. 4 is an example flow diagram of a first approach to reducing the negotiation required.

FIG. 4 is an example flow diagram of the first approach 400 to reducing the negotiation required. The secondary WTRU 330 may obtain information regarding a set of primary WTRUs 320 needing assistance from the BS 310, at 405. The secondary WTRU 330 may also begin the procedure by listening to the transmissions of the set of primary WTRUs, at 410. Next, the secondary WTRU 330 decides whether to assist in any primary WTRU's transmission to the BS 310, at 420. The decision on whether to assist may be based on measurements made by the secondary WTRU 330, or by information received from the BS 310. If the secondary WTRU 330 decides to assist, it begins cooperating with the primary WTRU 320 in the primary WTRU's transmission to the BS 310, at 430. The cooperation may be performed in such a way that it is transparent to the primary WTRU 320.

If the cooperation results in the BS 310 receiving the data faster than it would have with out the participation of the secondary WTRU 330, the secondary WTRU 330 may receive the benefit of the saved spectrum access, at 440.

Figure 5:
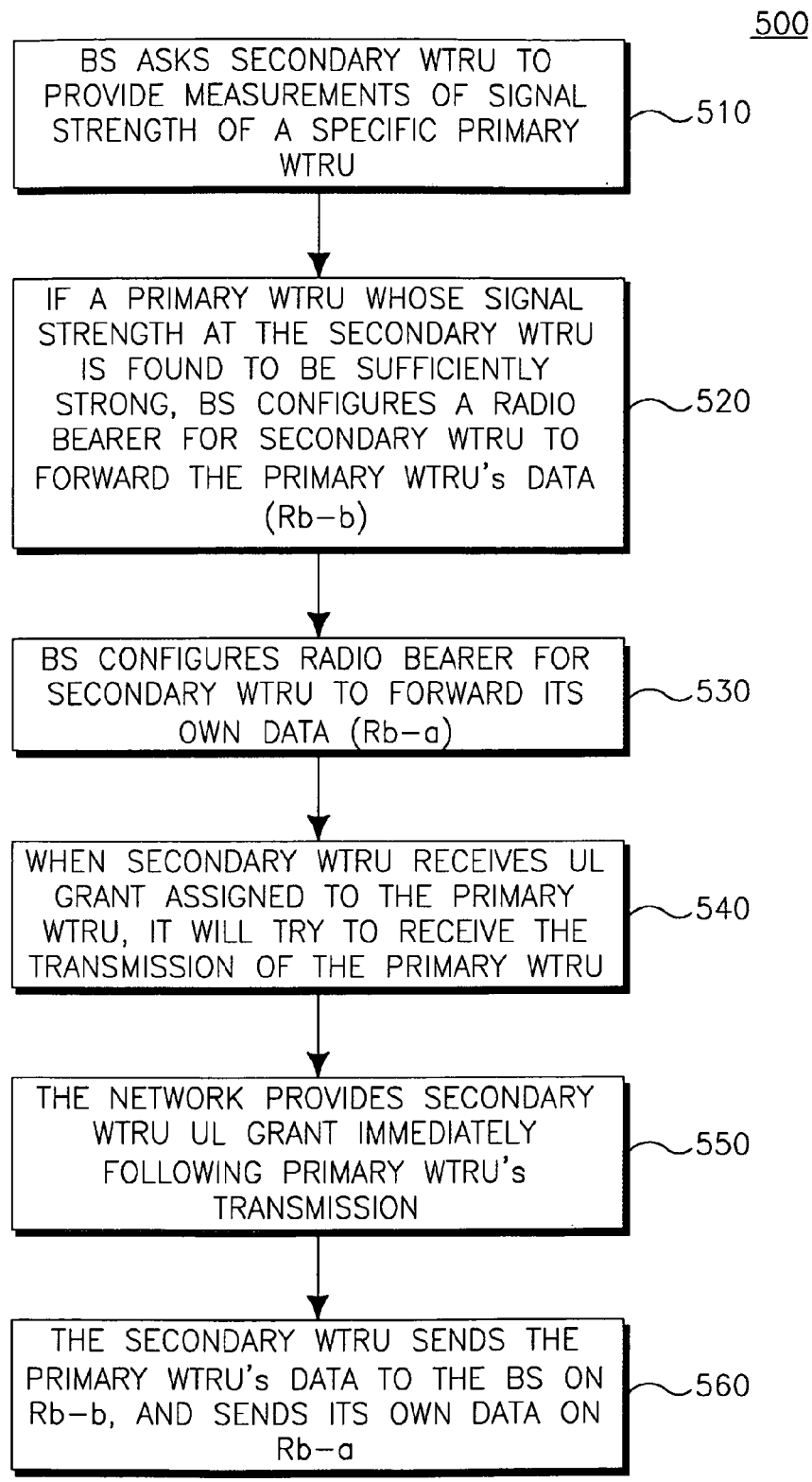
FIG. 5 is an example flow diagram of a second approach to reducing the negotiation required.

FIG. 5 is an example flow diagram of a second approach 500 to reducing the negotiation required. In the second approach, the BS 310 asks the secondary WTRU 330 to measure the signal strengths of a specific primary WTRU 320, at 510. If necessary, the BS 310 may provide the secondary WTRU 330 with sufficient information about how to perform the measurements. If a primary WTRU 320 who's signal strength at the secondary WTRU 330 is sufficient strong, the BS 310 will configure a radio bearer (RB-b) for the purpose of allowing the secondary WTRU 330 to forward the primary WTRU's data, at 520. If the secondary WTRU 330 does not have a radio bearer already configured for its own data transmission, the BS 310 will configure one as (RB-a), at 530. When the secondary WTRU 330 receives an UL grant assigned to the primary WTRU 320, it will try to receive the transmission of the primary WTRU 320, at 540. The BS 310 will provide an UL grant for the secondary WTRU 330 immediately following the primary WTRU's transmission, at 550. Then the secondary WTRU 330 will send the received primary WTRU data on RB-b and depending on the grant may send its own data on RB-a.

Both approaches remove any negotiation between the secondary WTRU 330 and the primary WTRU 320. Further depending on how each approach is implemented, the interaction between the secondary WTRU 330 and the BS 310 may be minimized. To further realize the implementation of either approach, several different communication modes must be considered as solutions for how a secondary WTRU may gain spectrum access through cooperation.

In per-packet data unit (Per-PDU) mode (ppM), the secondary WTRU's reward depends on how much it is able to assist in the transmission of each medium access control (MAC) PDU. Based on information (such as a grant) about the number of transmission a primary WTRU 320 is expected to need to get its data to the BS 310, a secondary WTRU 330 may make a decision as to whether it should assist in the transmission of each particular MAC PDU. If it decides to assist and the PDU is transmitted successfully much faster than would have otherwise been possible, the left-over transmission opportunities are given to the secondary WTRU 330.

In Negotiated Mode (nM), the BS 310 rewards the secondary WTRU 330 with a grant for some spectrum in exchange for assistance with the primary WTRUs uplink transmission. This may become a market game with two players. For example, the BS 310 doesn't want to grant too much spectrum, and it also wants to tie the reward to the actual benefit (i.e. if the secondary WTRU's assistance doesn't amount to much, then it shouldn't receive to much of a benefit). However, if the BS 310 does not reward the secondary WTRU 330 enough, it may decide to stop assisting that particular primary WTRU 320. The BS 310 may also pre-advertise an initial reward for assisting a primary WTRU 320 (either per primary WTRU or even per grant) with the understanding that the reward is to be adjusted based on the value of the transmission offered.

The nM model requires more complex algorithms at the secondary WTRU 330 (to decide whether it wants to assist primary WTRUs and to what extent based on the reward it expects) and at the BS 310 (to decide how much to reward a secondary WTRU for its assistance). In contrast, the ppM model presents a challenge in figuring out what the expected number of transmissions the primary WTRU 320 would have needed were it not for the secondary WTRU's assistance.

Most cellular systems provide a commonly accessible channel or a set of PHY signals that carry the grants from the BS 310 to the primary WTRU 320. However, in most cases the grants are masked (i.e., scrambled) with a primary WTRU-specific sequence, or other primary WTRU-identifying information is appended and/or used with the grant. While the primary WTRU-specific information is not necessarily highly secure and therefore could, in principle, be disclosed, it is often not reasonable to expect that a secondary WTRU 320 would be able to obtain the grant scrambling sequence at connection set up. To alleviate this issue, a new downlink control channel, mobile station (MS) assistance request channel (MARCH), is provided. A MARCH is a MAC channel that may be referred to as a transport channel in 3GPP terminology, which is mapped to PHY resources similar to other common MAC channels. Alternatively, the information is a control element (i.e., a system information block (SIB) in 3GPP) transmitted on an existing control channel. The method and apparatus provided herein may treat this as a channel, but it may apply to both scenarios.

The primary WTRUs, specifically legacy WTRUs, may simply ignore this channel. A MARCH may carry a list of primary WTRUs that are in need of assistance, presumably because they are in poor conditions, but that is based on the network. For each primary WTRU, MARCH may carry the following general information: information necessary to receive uplink grants intended for the primary WTRU 320; information necessary to detect and receive primary WTRUs' transmissions for purposes of cooperation; and if the nM mode is used, the MARCH may also carry the initial assistance offer for each primary WTRU 320.

The information transmitted on MARCH may be periodically repeated and updated. Moreover, multiple MARCHs may be defined so that a secondary WTRU 330 may choose to listen to only one or more than one. Thus, for example, direction specific MARCHs may be defined.

MARCH may be used to enable either of the two approaches of FIGS. 4 and 5. For the approach of FIG. 5 the BS 310 may use other existing signaling either with or without a separate MARCH as a means to tell each secondary WTRU 330 which primary WTRUs 320 to measure. However, new information elements may need to be added to the information elements already used by the BS 310.

The MARCH may carry information which is pertinent to only the secondary WTRUs which could also include secondary access to random access channel (RACH) resources as well as mechanisms and parameters to be used when secondary WTRUs 330 are assisting a primary WTRU 320 in cell edge enhancements. In order to speed up the acquisition of new updates of the MARCH by the secondary WTRUs 330, the BS 310 may page secondary WTRUs 330 with a specific field indicating to the secondary WTRUs 330 that the MARCH is updated. This is important, because secondary WTRUs 330 need to be informed promptly about a primary WTRU 320 in need of assistance.

Alternatively, secondary WTRUs 330 camping in a cell may announce to the BS 310 their capability, their willingness to act as a secondary WTRU 330 and other information (i.e., location). The BS 310, based on the location information and capabilities, may page a secondary WTRU 330 requesting assistance.

For the approach of FIG. 4, the ppM reward model may be used. A secondary WTRU 330 may make a decision to cooperate if the cooperation may create a sufficient spectrum opportunity. Because it does so only for primary WTRUs indicated on the MARCH, it may be sufficiently assured that in principle the primary WTRU may benefit significantly from cooperation (e.g., its channel to the BS is poor). However, this does not mean that the primary WTRU will benefit from cooperation from this particular secondary WTRU. The secondary WTRU may look at a number of variables such as for example: signal and/or channel quality between primary and secondary WTRUs; channel quality between the secondary WTRU and the BS; the transport format parameters (e.g., coding rate) selected by the primary WTRU for the transmission; and the expected gain to the secondary WTRU from cooperation.

These values may be obtained in a number of several ways, including for example: measurements made on transmissions by the primary WTRU 320; measurements made on transmissions by the BS 310, especially in Time Division Duplex (TDD) systems where the channel may be reciprocal; reception and decoding of the control portions of the information sent by the primary WTRU 320; feedback from the BS 310 directly to the secondary WTRU 330; and, MARCH data values.

As an example, the channel quality between the primary WTRU 320 and the secondary WTRU 330 may be best evaluated from direct measurement by the secondary WTRU 330 performed by partial reception of the primary WTRU signal.

Similarly, any necessary transport format parameters may be ascertained by reception of the appropriate primary WTRU control information.

Estimation of the channel quality from the secondary WTRU 330 to the BS 310 is more complicated. Depending on the specific system, a number of different approaches or a combination thereof may be used. All of these come at some cost to the overall system and thus selection of an approach has to be system-dependent. Specifically, some possible approaches are as following.

The secondary WTRU 330 may measure signals from the BS 310 and infer the uplink channel quality from the signals. This may work only if the channel is reciprocal (i.e., if the cellular system is TDD and not FDD).

The BS 310 may provide feedback to the secondary WTRU 330. This is the traditional method of addressing the problem in cellular systems and works well for primary WTRUs 320. However, as applied to secondary WTRUs 330, this approach presents a serious problem as it requires the secondary WTRU 330 to periodically communicate with the BS 310 to provide the BS 310 some means of estimating the channel. Furthermore, it requires the BS 310 to maintain a downlink connection with the secondary WTRU 330 to allow it to transmit channel quality feedback back to the secondary WTRU 330. The feedback transmission may be handled using a downlink passive approach to supporting a secondary WTRU 330. The BS 310 scheduler may schedule the transmission with appropriate priority trading off accuracy of information at secondary WTRU 330 with downlink overhead.

Because a secondary WTRU 330 receives less frequent transmissions from the BS 310, the transmissions may not be sufficient for accurate channel quality measurement. This may be alleviated by supporting a special secondary WTRU reverse beacon channel (SRBCH). This is a shared PHY resource which allows secondary WTRUs 330 to intermittently transmit a beacon to the BS 310 that will allow the BS 310 to perform channel quality estimation and identify the estimate with a particular secondary WTRU 330. The beacon may be, for example, a pilot sequence masked with a secondary WTRU specific mask known to the BS. It should be noted that this requires new PHY signaling in the uplink and additional downlink overhead.

Successful reception of a MARCH is an implicit indicator that the secondary WTRU-to-BS channel is of high quality. To accomplish this, a MARCH may need to be directional as well as power controlled so that only secondary WTRUs roughly in the correct spots are likely to receive the MARCH. This also means that many MARCHs may need to be supported as very few primary WTRUs (i.e., as few as one) 320 may be associated with each MARCH. Alternatively, because the MARCHs are highly directional and power controlled, the overhead may not be significant. Beamforming may allow multiple MARCHs to share same time-frequency resources and power control may reduce intercell interference thus allowing full intercell frequency reuse of these resources.

Evaluation of the expected gain from cooperation may also be done using several approaches, each with its own costs. The process is complicated by the fact that this evaluation may need to be carried out by both the secondary WTRU 330 and, if the secondary WTRU 330 does decide to cooperate, by the BS 310. The computation by the BS 310 is needed so that it expects and receives the secondary WTRU 330 transmissions as well as to make sure that the secondary WTRU 330 is not cheating. Furthermore, the BS 310 may need to come up with the same answer as the secondary WTRU 330.

The secondary WTRU 330 may use the channel quality reports, the primary WTRU transport format as well as the primary WTRU grant to estimate the number of re-transmissions that may be required with and/or without cooperation. This operation is completely transparent to the system, but it may be unreliable. Thus, it may be difficult to guarantee that the BS 310 and the secondary WTRU 330 arrive at the same solution. Additionally, it may be inefficient, too pessimistic for the secondary WTRU 330, or it will result in too many over-utilizations of the spectra by the secondary WTRU 330. Also, the computation may be highly complex or even not feasible, especially in the presence of adaptive modulation and coding. Furthermore, it has to be performed for every transmission of the primary WTRU 320.

A fixed formula may also be used which takes into account only easily known quantities, for example, grant properties and information transmitted in the MARCH. This is simple, however it does not take into account instantaneous channel conditions and may be highly spectrally inefficient.

The grant in non-persistent (i.e., ties to a specific data set to be transmitted by the primary WTRU) may also be used. The grant in non-persistent scheduling includes a value which corresponds to a maximal number of spectrum opportunities. The secondary WTRU 330 may use whatever spectrum opportunities are left over after the primary WTRU 320 completes transmission of the full dataset. This may be the easiest approach as in principle the secondary WTRU does not need to compute anything, it may always try to offer help. However, in practice, the secondary WTRU 330 may need to perform estimation of how much it would help to avoid spending its own resources in such cases where it is not likely to derive a benefit.

The secondary WTRU 330 may also send a bid to the BS 310 in which it proposes to purchase a certain number of spectrum opportunities for assisting with a given transmission. Such a message may even be piggy-backed on a first cooperative transmission, which the secondary WTRU 330 thus provides for free. The BS 310 may use a special channel to reply accepting or rejecting the bid. If the bid is rejected, then the secondary WTRU 330 ceases assisting with transmission of that particular data set.

As in the case of the ppM model, in the nM rewards model the secondary WTRU 330 may determine two quantities: how much a secondary WTRU 330 may able to help the primary WTRU 320 and how much rewards will the secondary WTRU 330 receive in return.

To compute how much it may be able to help the primary WTRU 320, the secondary WTRU 330 may depend on the same information as it does in the ppM mode. However, rather than computing the value on a per-PDU basis, it may compute from a long-term perspective as its reward may depend on a long-term assistance history and not only on one particular PDU.

The computation of potential reward, on the other hand, may be different from the ppM mode. This is based on whatever game theoretic algorithm the secondary WTRU 330 has and on the information such as, reward advertisement by the BS 310, and history of the actual rewards (i.e., spectrum grants) provided for previous assistance given to this primary WTRU 320. It may also be based on other information generally available to the secondary WTRU 330 and which the secondary WTRU 330 believes may impact the BSs reward decision. Various examples include network load, signal to interference plus noise ratio (SINR) conditions, or the like.

When the approach of FIG. 5 is used the BS 310 may make a decision whether or not it makes sense to use the secondary WTRU 330 for assistance based on the measurements reported by the secondary WTRU 330. The BS 310 may then notify the secondary WTRU 330 of its decision as well as its rewards via grants issued for RB-b (for assistance), and RB-a (for reward).

Preventing a primary WTRU 320 from abusing assistance is generally an issue only in the ppM mode using the approach of FIG. 4. Based on the description above, the primary WTRU 320 may be prevented from using spectrum which was made available by the action of the secondary WTRU 330 in a number of ways; one of which is using non-persistent grants. In this case, the BS 310 may not issue a new grant until the secondary WTRU 330 has had a chance to transmit the data it has earned the right to send. This approach may be transparent to the primary WTRU 320, but non-persistent grants may add overhead to the system.

A special stop-transmission signal may also be used. This may be appended to an acknowledgement (ACK) (i.e., ACK-and-STOP). The command may be associated with a time-duration, or it may require a particular event, such as a secondary-WTRU-ACK, new grant, or the like, to revoke. This approach requires modification of legacy WTRUs. However, it is likely more efficient than using non-persistent grants.

The impact on the cellular protocol structure is anticipated to be quite small. Because packet-based networks under consideration do not have dedicated PHY resources, there is no problem with switching a PHY resource from a primary WTRU 320 to a secondary WTRU. At the MAC level, the secondary WTRU 330 may use a RACH-like channel (sRACH); in particular, it may be mapped to the sRACH as described above. Alternatively, a persistent connection may be maintained for the secondary WTRU 330 above the MAC. Other methods such as a new MAC and/or transport channel may also be used.

The specific case of LTE is considered and how this concept may be implemented is described. In view of the description above, secondary WTRU 330 registration, primary WTRU 310 discovery by secondary WTRU 330, and a procedure for active cooperation and spectrum opportunity creation by secondary WTRU 330 are provided.

As noted above, one of two possible secondary WTRU access methods may be used: the secondary WTRU may either use a RACH like channel such as the sRACH to send its own data, or it may register with the network so that it exists in the radio resource control (RRC) connected state. In the first case, no action by the secondary WTRU 330 is required as the sRACH (i.e., same as the RACH) may be setup to enable access by WTRUs not otherwise known by the network to be in the cell.

In the second case, the secondary WTRU 330 may register and establish a RRC connected state connection using the standard LTE procedures. Some LTE synchronization procedures may need to be modified to allow secondary WTRUs 320 to remain in this state with only very infrequent communication.

A radio bearer, RB-a, may be configured for the secondary WTRU 320 under both the approach of FIG. 4 and FIG. 5. The radio bearer for assistance (RB-b), would only be configured as needed, when the secondary WTRU 330 is able to assist.

In LTE, the MARCH channel may have to enable the secondary WTRU 330 to receive the several different transmissions intended for the primary WTRU 320 it is assisting. In the downlink communication, a downlink control channel (DCCH) that carries grants and the physical downlink control channel (PDCCH) that carries the DCCH; hybrid automatic retransmission request (ARQ) indicator channel (HICH) that carries ACK/negative acknowledgement (NACK) and the physical hybrid HICH (PHICH) which carries the HICH. In the uplink communication, uplink shared channel (USCH) that carries data and the physical USCH (PUSCH) which carries USCH.

In order to be able to receive these transmissions, the MARCH may need to carry the primary WTRU RNTI for each primary WTRU 320 in need of assistance. The discovery of primary WTRUs 320 otherwise follows the general procedures discussed above. In the approach of FIG. 5, the same information would have to be provided to the secondary WTRU 330, however, the use of the MARCH is not required as is noted above.

Figure 6:
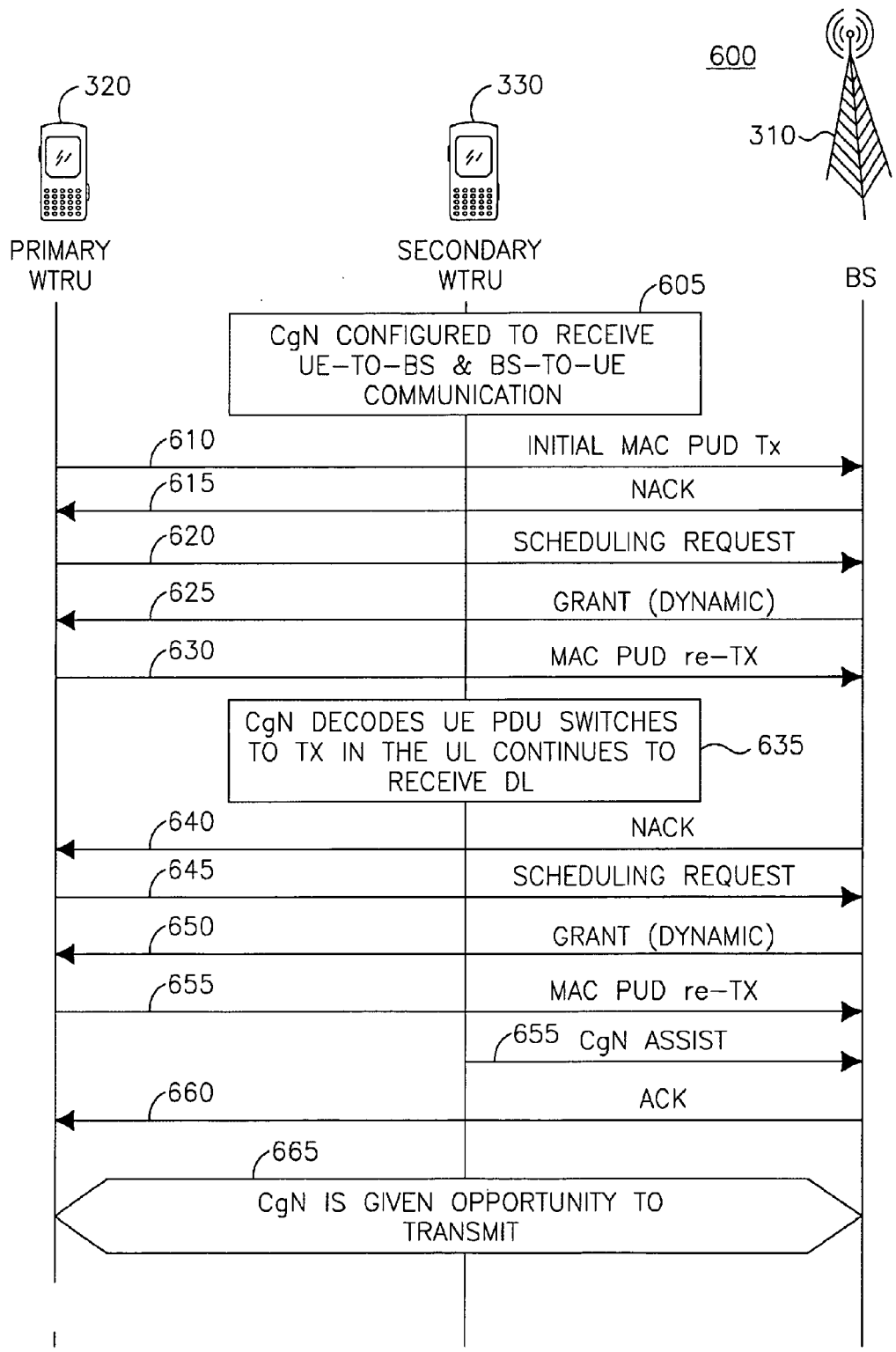
FIG. 6. shows an example procedure for either of the approaches of FIG. 4 or FIG. 5 for a transmission in which a secondary WTRU 330 assists a primary WTRU and obtains its own spectrum opportunities.

FIG. 6 shows an example LTE call flow diagram 600 for either of the approaches of FIG. 4 or 5 for a transmission in which a secondary WTRU 330 assists a primary WTRU 320 and obtains its own spectrum opportunities for transmission to the BS 310. The procedure begins when the secondary WTRU 330 has made a decision to assist the primary WTRU 320. The nature of decision making is described in general hereinbefore and does not change substantially when considering in LTE specifically. Having made the decision to assist, the secondary WTRU 330 may configure itself to receive both the UL primary WTRU-to-BS communication as well as the downlink (DL) BS-to-primary WTRU communications at 605. Next, the primary WTRU 320 send an initial MAC PUD Tx to the BS 310, at 610. The BS 310 sends back a NACK, at 615. Then, the primary WTRU 320 sends a Scheduling Request to the BS 310, at 620. The BS 310 then sends back a grant (either dynamic or semi-persistent, therefore each transmissions may or may not require a new grant), at 625. The primary WTRU 320 then responds by sending another MAC PUD re-Tx, at 630.

After a few transmissions, the secondary WTRU 330 may be able to decode the communication from the primary WTRU 320, at 635. At the same time, the BS 310 sends back a NACK, at 640. The primary WTRU 320 responds by sending another Scheduling Request, at 645. The BS 310 responds by sending a grant, at 650. Then the primary WTRU 320 sends another MAC PUD re-TX, at 655. The secondary WTRU may then generate a CgN assist message cooperating with the Primary WTRU 320, at 655. With the assistance of the secondary WTRU 330, the BS 310 is able to receive the MAC PUD, and the BS 310 sends back an ACK, at 660. The communication continues with secondary WTRU 330 being given the opportunity to assist in the communication at 665.

As is shown in FIG. 6, if the secondary WTRU 330 is able to decode the primary WTRU PDU before the base station BS 310 is able to do so, the secondary WTRU 330 begins assisting the primary WTRU 320, which permits the transmission process to complete faster.

Once the procedure 600 is complete, the secondary WTRU 330 is permitted to collect its reward. If the ppM protocol is used, then the secondary WTRU 330 may use up the transmission opportunities which would have otherwise been used by the primary WTRU 320. If the nM protocol is used, the BS 310 issues a grant or a series of grants to the secondary WTRU 330.

In order for the procedure 600 of FIG. 6 to be effective, the primary WTRU transmission parameters may be tuned so that the primary WTRU 320 is likely to need several retransmissions to get data across to the BS 310. At least two transmissions per PDU may be needed for the secondary WTRU 330 to have an opportunity to help. In the case of the ppM protocol, the primary WTRU 320 may be tuned to require even more transmissions than two in order to provide an opportunity for secondary WTRU 330 to send its own data. Thus, the overall approach may have an impact on latency, and the impact is much more pronounced with the ppM protocol.

Figure 7:
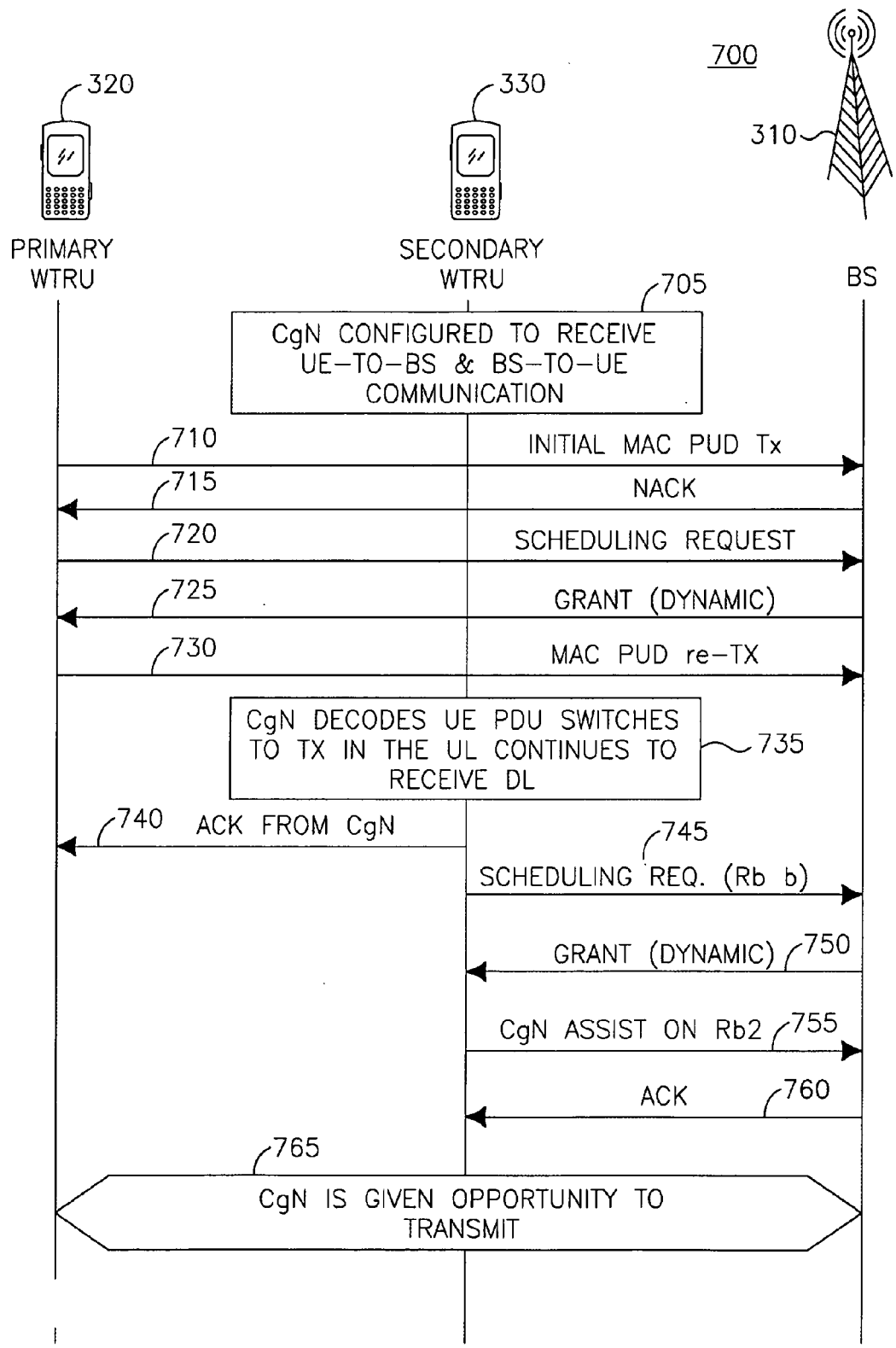
FIG. 7. shows another example procedure for a secondary WTRU providing assistance in which the relaying configuration is a 2-hop.

FIG. 7 shows another procedure 700 where the relaying configuration is a 2-hop. This configuration requires that the secondary WTRU is able to transmit to the primary WTRU as well as receive from it. This may be better suited to the approach of FIG. 5 than the procedure of FIG. 6 is.

Having made the decision to assist, the procedure 700 begins when the secondary WTRU 330 configures itself to receive both the UL primary WTRU-to-BS communication as well as the downlink (DL) BS-to-primary WTRU communications 705. Next, the primary WTRU 320 send an initial MAC PUD Tx to the BS 310, at 710. The BS 310 sends back a NACK, at 715. Then, the primary WTRU 320 sends a Scheduling Request to the base station 310, at 720. The BS 310 then send back a grant (either dynamic or semi-persistent, therefore each transmissions may or may not require a new grant), at 725. The primary WTRU 320 then responds by sending another MAC PUD re-Tx, at 730. The secondary WTRU 330 then decodes the primary WTRU PDU and continues to receive the DL signaling, at 735. Upon successfully decoding the primary WTRU PDU, the secondary WTRU 330 sends an ACK to the primary WTRU 320, at 740, and a Scheduling Request to the BS 310 on RB-B, at 745. Then the BS 310 sends a Grant to the secondary WTRU 330, at 750. The secondary WTRU 330 responds by sending a CgN Assist message on RB-b, at 755. The BS 310 sends an ACK to the secondary WTRU 330, at 760 and the communication continues with the secondary WTRU assisting at 765.

Figure 8:
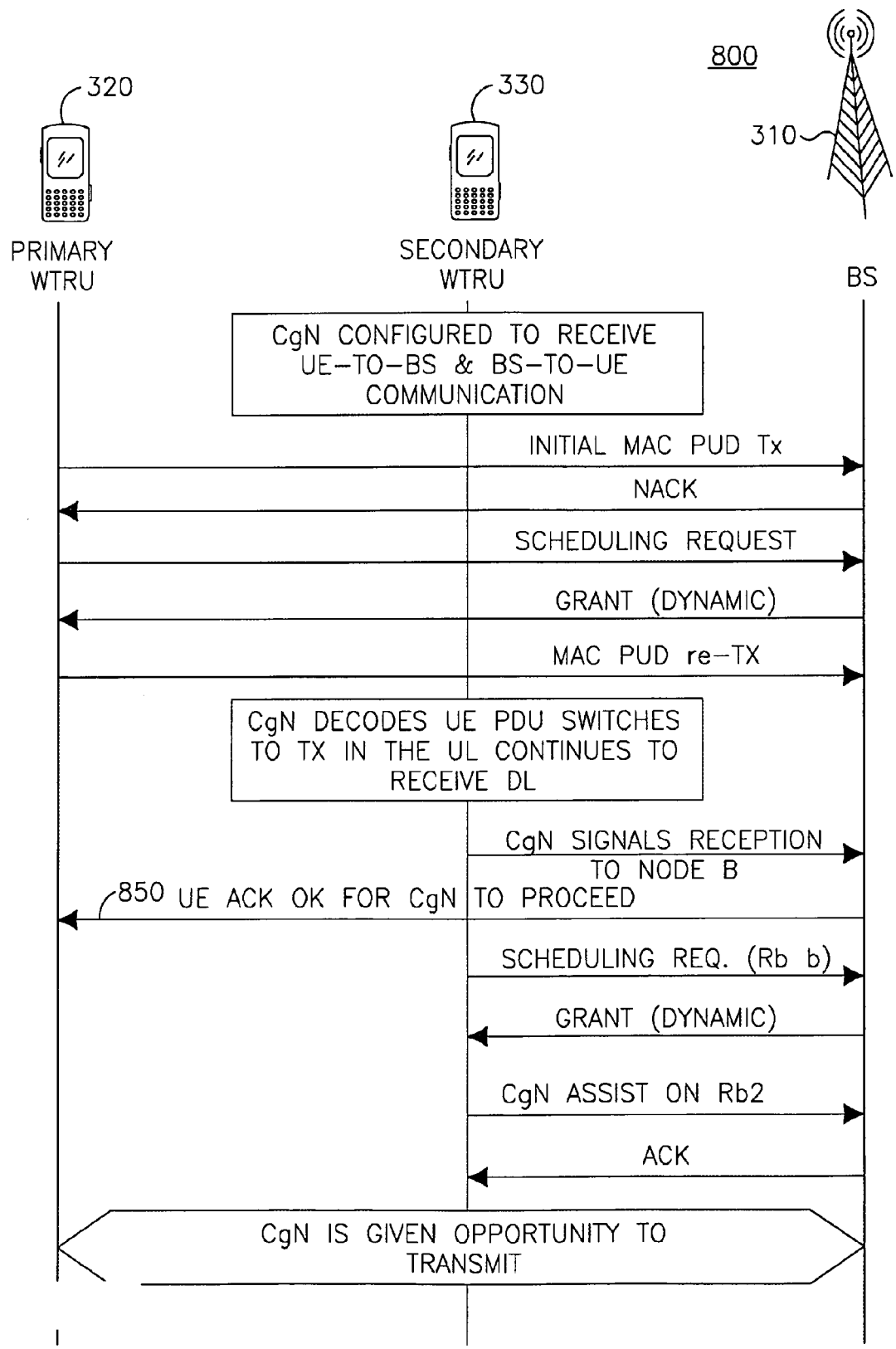
FIG. 8 shows another procedure in which the 2-hop solution of FIG. 7 is modified slightly.

FIG. 8 shows another procedure 800 in which the 2-hop solution of FIG. 7 is modified slightly to remove the requirement that the secondary WTRU 330 be able to communicate directly with the primary WTRU 320. Using the network control that is in inherent in the approach of FIG. 5, a further modification of the 2-hop solution is possible which eliminates the need for the secondary WTRU 330 to communicate directly with the primary WTRU 320 by having the BS 310 send a special ACK 850. The special ACK 850 is treated as a normal ACK by the primary WTRU 320, but it is treated as a signal to start assistance by the secondary WTRU 330. This modified 2-hop procedure also requires the secondary WTRU 330 to be able to notify the BS 310 that it can successfully receive the primary WTRU 320 transmissions.

The major issue related to the signal modifications needed to enable the ppM model revolves around the loosely defined quantity of the expected number of transmissions, such as how the secondary WTRU 330 determines this and how the primary WTRU 320 is prevented from using these for the next transmission.

There are several ways to prevent the primary WTRU 320 from using the opportunities created by help from the secondary WTRU 330 for its own benefit. One solution a use of a dynamic grant. In this case, the BS 310 may not forward a new grant to the primary WTRU 320 until the secondary WTRU 330 has completed using the spectrum opportunities that it earned by providing assistance.

Another solution is through the use of a modified ACK/NACK protocol. Upon a successful reception of the primary WTRU's data, the BS 310 may send a NACK, but does not give the primary WTRU 320 any new grants. These are instead provided directly to the secondary WTRU 330, which may be informed of this using appropriate DL signaling. Once the secondary WTRU 330 uses up its spectrum opportunities, the primary WTRU 320 transmission is acknowledged. This approach requires that a primary WTRU 320 may now be configured to expect and listen for an ACK when it made no transmissions, and this may require modification of the primary WTRU's operation.

Use of a special ACK, (only needed if the primary WTRU 320 is in a semi-persistent grant mode), while acknowledging successful reception, prevents the primary WTRU 320 from sending a fresh transmission for a defined period of time.

A method for how the secondary WTRU 330 determines its reward is provided. While the general description outlines how this may be computed from various channel conditions, the easiest and most reliable method for achieving this is via signaling.

The grant to the primary WTRU 320 may be modified to carry a new value; the minimum retransmission allocation. This may signal to the secondary WTRU 330 that the BS's 310 scheduler is expecting this transmission to require at least the number of attempts before success. If the secondary WTRU 330 may facilitate successful transmission in less than the number of attempts, it may use the rest for its own transmissions. This value may also be used to signal the primary WTRU 320 a minimum time interval between subsequent first transmissions of data, thus eliminating the need for a special ACK discussed above.

Alternately, the special ACK as discussed above may be interpreted by secondary WTRU 330 in the same manner as the primary WTRU 320, but for a different purpose. While the primary WTRU 320 may use the information to learn how long to wait before next transmission, the secondary WTRU 330 uses it to learn how many spectrum access opportunities, or how much time, it has to send its own data.

In the nM protocol, it is conceptually simpler for the secondary WTRU 330 to obtain its rewards. The secondary WTRU 330 may forward scheduling requests to the BS 310 as any other WTRU. However, its ability to obtain grants and the size of the grant depends on the extent to which it has been helpful.

In LTE, uplink performance may degrade in the cell edge. In order to enhance uplink cell edge performance, the BS 310 may configure the primary WTRU 320 to operate in Transmission Time Interval (TTI) bundling mode. In TTI bundling mode, when the primary WTRU 320 receives an uplink grant, the primary WTRU 320 may send the same coded information over four (4) consecutives TTIs. A legacy R8 primary WTRU 320 operating in cell edge may benefit from the help of a secondary WTRU 330.

Uplink cell edge performance is may be enhanced according to the following example. A secondary WTRU X camps on cell Z and announces to the BS that it has secondary usage capability and other information such as location position to help primary WTRU. A primary WTRU Y is operating at the cell edge and uplink performance is degrading. A BS may detect that the primary WTRU Y requires uplink enhancement. Option 1 may be that a BS may advertise on the MARCH that some WTRU requires help, or option 2 may be that the BS may page the secondary WTRU X to request some help.

A secondary WTRU X may accept and send an intention proposal to the BS to help the primary WTRU Y. The BS may evaluate if the secondary WTRU X may help the primary WTRU Y. After a positive evaluation, the BS may inform the secondary WTRU X of the identity of the primary WTRU Y including the configured Radio Network Temporary Identifier (RNTI)_Y and the reward in TTIs in exchange for helping the primary WTRU Y. An additional handshake between the BS and the secondary user X may be required to ensure that the reward is acceptable.

The secondary WTRU X is now bonded with the primary WTRU Y and the secondary WTRU X may start monitoring uplink grants for RNTI_Y on the PDCCH. The secondary WTRU X may successfully decode an uplink grant for the primary WTRU Y at a subframe_a. At a subframe_a+4, the primary WTRU Y may send coded information and the secondary WTRU X may decode the coded information based on the grant received.

At a subframe a+4+k, where k is agreed between the secondary WTRU X and the BS, the secondary WTRU X may send information which was received from the primary WTRU Y using a replica of the grant received at the subframe_a. At a subframe a+4+k+l, where l is agreed between the secondary WTRU X and the BS, the secondary WTRU X may send information originated using a replica of the grant received at the subframe_a.

Therefore, in this example, the network may be able to reduce the number of transmissions from four (4) in the context of TTI bundling to three (3). One transmission from the primary WTRU Y, another one from the secondary WTRU X to transmit the information originating from the primary WTRU Y, and one last one from the secondary WTRU X to transmit the information originating from the secondary user X.

As noted, there are two approaches to the cognitive problem—a passive one and an active one. In the passive approach the secondary WTRU 330 must be able to detect the presence of a spectrum opportunity and take advantage of it. Moreover, this must be done in a way that will enable the NB 310 to receive what is an unexpected transmission from the secondary WTRU 330.

In the uplink the problem may be addressed by a scheme similar to the Random Access (RACH) schemes in 3GPP HSPA and LTE. The network creates a RACH-like Transport Channel (TrCH) which may be accessed by any secondary user. We shall refer to this channel as secondary-user RACH (sRACH).

Figure 9:
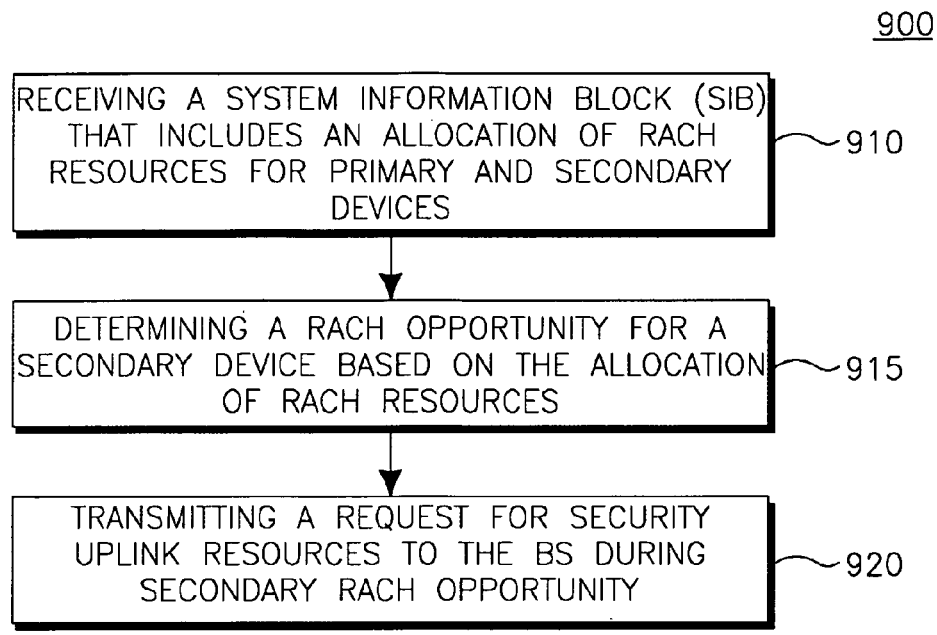
FIG. 9 shows an example flow diagram of a procedure for secondary WTRU to access the medium using a passive approach.

FIG. 9 shows an example flow diagram of a procedure 900 to define specific RACH resources that are only usable by primary WTRUs from the total set of available RACH resources. The other RACH resources are usable by both the primary and the secondary WTRUs and may be referred to hereinafter as secondary RACH (sRACH) resources.

The procedure 900 begins when the secondary WTRU 330 receives a system information block (SIB) that includes an allocation of RACH resources for primary and secondary WTRUs, at 910. Next, the secondary WTRU 330 determines a sRACH opportunity for a secondary WTRU based on the allocation of RACH resources, at 915. Finally, the secondary WTRU 330 transmits a RACH message to the BS using one of the sRACH resources, at 920.

At 910, the BS 310 informs all camping WTRUs of contentious based RACH resources on the SIB channel (SIB2). SIB2 carries the root index, the cyclic shift and the number of transmission opportunity for the Physical Random Access Channel (PRACH) (1 to 64). It also provides preamble formats to be used (0 to 3). The SIBs are carried over the Physical Downlink Shared Channel (PDSCH). Resource allocations for the SIBs are identified by the WTRUs by monitoring the Physical Downlink Control Channel (PDCCH) using the System Information Radio Network Temporary Identifier (SI-RNTI) address, which is known by all camping WTRUs. Therefore, all devices camping on a cell, whether primary or secondary, can have access to the SIBs and derive the contentious based RACH resources.

To support the method 900 and assuming that primary WTRUs are legacy devices, one possible approach to notifying the WTRUs of the secondary RACH resources is to send the contentious based RACH resources on the SIBs as in LTE Release 8 (R8) and to broadcast an additional SIB field or control element to indicate the subset of the total RACH resources accessible by secondary WTRUs 330. Therefore, secondary WTRUs would first capture the total RACH resources available as in LTE R8, and decode a new control element to derive the subset of the total RACH resources accessible by the secondary WTRUs 330. This control element could be a simple integer value indicating where the subset starts in terms of transmission opportunity relative to the total RACH resources.

Another possible feature for the procedure of FIG. 9, is to provide common RACH resources for all WTRUs but indicate in the common control channel a Boolean value enabling or disabling access to the RACH resources by secondary WTRUs 330. In time of congestion due to high activity of users, the network may disable access to the RACH resources for secondary users. Alternatively, the primary WTRUs 320 could be legacy devices (LTE R8). The RACH resources would be indicated as in LTE R8 and only the secondary WTRUs 330 would need to fetch a Boolean value indicating whether RACH resources are available or not for the secondary WTRUs. In order to inform all secondary users that the Boolean value has changed, the BS 310 could page secondary WTRUs.

Using the procedure of FIG. 9, the PHY resources allocated to the RACH may be varied dynamically to reflect actual usage of the uplink spectrum by the primary WTRUs 320. Since WTRUs may request access to resources using the RACH that has been allocated for primary and secondary usage, the only modification required is a means to dynamically indicate which resources are available for secondary usage.

In most communication systems, including LTE, grants are always WTRU-specific. However, a special "secondary use" grant may be allocated to indicate which resources are available for the secondary sRACH resources. This grant would use a special indicator (secondary use) instead of a WTRU specific id typically present in a grant. Otherwise, a secondary use grant may have the same properties and capabilities as any other grant in a cellular system.

The access procedure for the resources allocated in this fashion shall be the same as the access procedure for the standard Random Access channel in the system, except that the grant shall be continually monitored. If a secondary WTRU 330 selects a resource for accessing sRACH and the resource disappears from the grant, the secondary WTRU 320 shall immediately discontinue the use or transmission over the given resource—even if this means that it has to interrupt an ongoing transmission. To mitigate the problem of frequent incomplete transmissions by secondary WTRUs 330, cellular systems may take several measures.

For example, PHY resources being changed from RACH to sRACH may be performed fairly infrequently. However, the operator may be slower to respond to changes in available spectrum, and it may also need to keep more spectrum "in reserve" to prevent running out of spectrum available for primary WTRUs 320.

Also, grants removing resources from sRACH may be transmitted sufficiently ahead of time to allow most secondary WTRUs with on-going transmissions to complete these, while preventing other secondary WTRUs from attempting to access such resources. This may require some additional signaling such as a frame number of the frame when the grant is to take effect, or number of frames after reception before grant takes effect.

Figure 10:
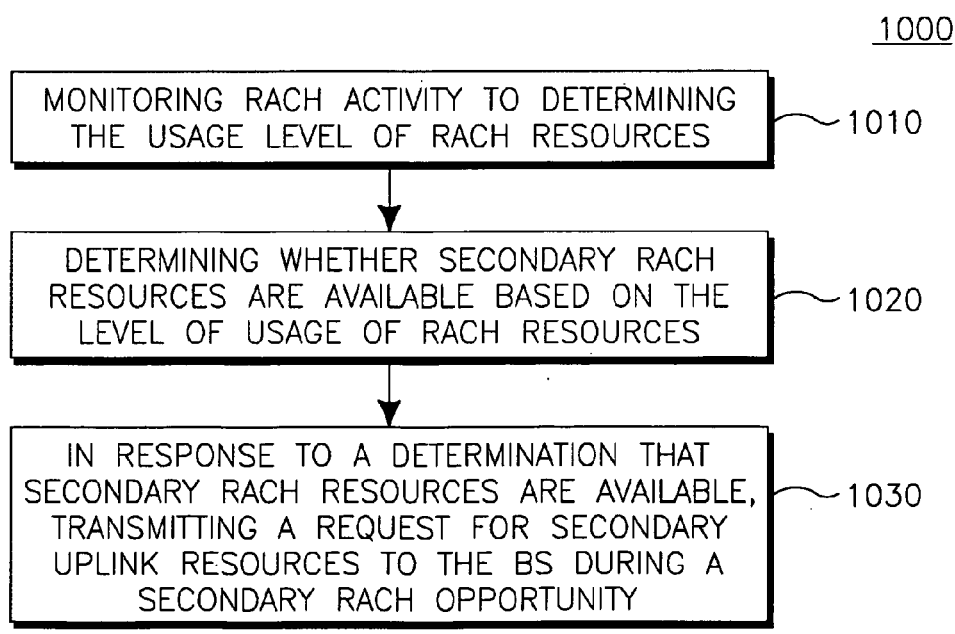
FIG. 10 shows an example flow diagram of another procedure for secondary WTRU to access the medium using a passive approach.

FIG. 10 shows another procedure 1000 for a secondary WTRU 330 to gain access to RACH resources. The procedure begins with the secondary WTRU 330 monitoring RACH activity in order to determine the usage level of RACH resources, at 1010. Next, the secondary WTRU 330 determines whether secondary RACH resources are available based on the level of usage of RACH resources, at 1020. In response to a determination that secondary RACH resources are available, the secondary WTRU 330 transmits a request for secondary uplink resources to the BS 310 during a RACH opportunity. In order to determine the level of RACH activity, secondary WTRUs 330 may be required to monitor for a short period the channel carrying the RACH response in the downlink. Based on certain rules of activity level of this channel such as the presence or the number of RACH responses denied due to congestion, the secondary WTRUs 330 may or may not have access to the RACH resources.

Another method to determine the level of RACH activity relies on additional measurement capability for the secondary WTRUs 330. Here, prior to using RACH resources, the secondary WTRU 330 would need to monitor paging response activity to estimate the usage of the RACH resources. One approach would be to decode all paging responses sent over the downlink shared channel, e.g. PDSCH, within the WTRU group using the Random Access Radio Network Temporary Identifier (RA-RNTI) address during a configurable period. If the secondary WTRU 330 detects collision events in its group by, for example, successfully decoding a paging response for its RA-RNTI but with no preamble identifier present or with a backoff order present, then the secondary WTRU 330 does not have access to the RACH resources. A backoff period could be used prior to resuming the monitoring and RACH access.

Alternatively, the estimate of the usage level of the RACH resources could be based on monitoring the RACH channel itself. The secondary WTRUs 330 may have the capability to monitor the RACH channel itself and if based on some energy detection scheme, the energy level in the RACH channel is higher than a certain threshold, the secondary WTRU 330 cannot have access to RACH resources in the cell.

Once a secondary WTRU 330 has gained access to the RACH resources, communication may proceed according to communication standards, such as LTE.

Embodiments

1. A method comprising:
enabling use of a secondary cellular spectrum by a cognitive node (CgN).

2. The method as in embodiment 1 wherein the CgN is a secondary wireless transmit receive unit (WTRU).

3. The method as in any preceding embodiment, further comprising:
listening for a transmission generated from a primary WTRU.

4. The method as in any preceding embodiment, further comprising:
determining whether to assist in a transmission based on measurements provided by the network.

5. The method as in embodiment 4 wherein on a condition that the determination is positive, cooperating with the transmission of data to a Node B.

6. The method as in any of embodiments 4-5 wherein on a condition that the Node B receives the data faster than anticipated, the CgN receives access to spectrum.

7. The method as in any preceding embodiment, further comprising:
including a per-PDU mode (ppM) and a negotiated mode (nM) as a secondary spectrum access modes.

8. The method as in embodiment 7 wherein an amount of access to spectrum is based on amount of assistance the CgN is providing in transmission of each MAC PDU.

9. The method as in any of embodiments 7-8 wherein the CgN decides to assist in transmission of each MAC PDU on the need of a primary WTRU.

10. The method as in any of embodiments 7-9 wherein on a condition that the CgN decides to assist in the transmission and the PDU is transmitted successfully much faster, then the remaining transmission opportunities are provided to the CgN.

11. The method as in any of embodiments 7-10 on a condition that the CgN assists a primary wireless transmit receive unit, the CgN receives a grant for predefined spectrum.

12. The method as in any preceding embodiment, further comprising:
providing a mobile station assistance request channel (MARCH) for a primary or secondary wireless transmit receive unit (WTRU).

13. The method as in embodiment 12 wherein the MARCH is a MAC channel mapped to PHY resources.

14. The method as in any of embodiments 12-13 wherein the MARCH carries information to receive uplink grants intended for the primary WTRU.

15. The method as in any of embodiments 12-14 wherein the MARCH carries information to detect received transmission of the primary WTRU.

16. The method as in any of embodiments 12-15 wherein the MARCH carries an initial assistance offer for each primary WTRU on a condition that an nM is used.

17. The method as in any of embodiments 12-16 wherein the information transmitted on the MARCH is periodically repeated and updated.

18. The method as any of embodiments 12-16, further comprising:
including multiple MARCHs.

19. The method as in any of embodiments 12-18 wherein the information carried on MARCH is pertinent to a secondary WTRU that includes an access to random access channel (RACH) resources.

20. The method as in any of embodiments 12-19, further comprising:
paging a secondary WTRU indicating that the MARCH is updated.

21. The method as in any of embodiments 12-20, further comprising:
providing capabilities and location to act as a secondary WTRU.

22. The method as in any of embodiments 12-21 wherein a Node B pages a secondary WTRUs based on their location and the capabilities requesting assistance.

23. The method as in any preceding embodiment wherein the CgN determines at least one of channel quality between a primary and the CgN, channel quality between the CgN and a Node B, the transport format parameters selected by the primary wireless transmit receive unit (WTRU) for transmission, or the expected gain to the CgN from cooperation.

24. The method as in embodiment 23 wherein the determination is made based on a measurement made by the secondary WTRU, measurements made on transmissions by a Node B, reception and decoding of the control portions of the information, feedback from the Node B to secondary WTRU, or MARCH data values.

25. The method as in any preceding embodiment, further comprising:
measuring signals from a Node B and inferring the uplink channel quality from the measured signals.

26. The method as in any preceding embodiment, further comprising:
a Node B providing a feedback to the secondary WTRU.

27. The method as in any preceding embodiment wherein a special CgN reverse beacon channel (SRBCH) is supported.

28. The method as in embodiment 27 wherein the beacon is a pilot sequenced masked with a CgN specific mask.

29. The method as in any of embodiments 12-28 wherein the MARCH is a directional channel and is power controlled.

30. The method as in any of embodiments 12-29, further comprising:
providing beamforming to share same time-frequency resources.

31. The method as in any preceding embodiment wherein the CgN utilizes channel quality report, a wireless transmit receive unit (WTRU) transport format, and a primary wireless transmit receive unit (WTRU) grant.

32. The method as in any preceding embodiment wherein grant properties and information transmitted in the MARCH are utilized.

33. The method as in any preceding embodiment wherein the CgN uses spectrum opportunities that are remaining after a wireless transmit receive unit (WTRU) completes the transmission of a full data set.

34. The method as in any preceding embodiment wherein the CgN performs estimation of amount of assistance to provide.

35. The method as in any preceding embodiment wherein the CgN transmits a bid to purchase an amount of spectrum opportunities.

36. The method as in embodiment 35 wherein the bid is piggy backed on a first cooperative transmission.

37. The method as in any of embodiments 35-36 wherein a Node B provides an acceptance or a rejection of the bid.

38. The method as in any preceding embodiment wherein computation of an amount of assistance to provide is based on at least one of reward advertisement by a Node B or a history of an actual reward provided in a previous assistance.

39. The method as in embodiment 38 wherein the actual reward is spectrum grant.

40. The method as in any preceding embodiment wherein computation of an amount of assistance to provide is based on at least one of network load or signal to interference plus noise ratio (SINR) condition.

41. The method as in any preceding embodiment wherein a Node B does not provide a grant to the CgN until the CgN transmits data.

42. The method as in any preceding embodiment wherein a special stop-transmission signal is utilized associated with a time duration.

43. The method as in any preceding embodiment, further comprising:
utilizing a random access channel (EACH) transport channel (sRACH).

44. The method as in any preceding embodiment, further comprising:
registering CgN with a network and establishing a connected RRC state.

45. The method as in any preceding embodiment, further comprising:
enabling the CgN to receive a transmission intended for a primary wireless transmit receive unit (WTRU).

46. The method as in embodiment 45 wherein in a downlink communication the transmission is received on a downlink control channel (DCCH) and a hybrid automatic retransmission request (ARQ) indicator channel (HICH).

47. The method as in embodiment 46 wherein the DCCH carries grants.

48. The method as in any of embodiments 46-47 wherein the HICH carries an ACK/NACK.

49. The method as in embodiment 45 wherein in an uplink communication the transmission is received on a USCH.

50. The method as in embodiment 49 wherein the USCH carries data.

51. The method as in any of embodiments 46-50 wherein a MARCH carries an radio network temporary identifier (RNTI) of the primary WTRU.

52. The method as in any preceding embodiment wherein the CgN configures to receive both uplink wireless transmit receive unit (WTRU)-to-Node B communication and downlink Node B-to-WTRU communication.

53. The method as in any preceding embodiment wherein the mobile station is configured with a dynamic or semi-persistent grant.

54. The method as in any preceding embodiment wherein on a condition that the CgN is permitted a reward, the CgN uses up transmission opportunities while in a per-PDU mode (ppM).

55. The method as in any preceding embodiment wherein on a condition that the CgN is permitted a reward, a Node B issues a grant to the CgN while in a negotiated mode (nM).

56. The method as in any preceding embodiment wherein at least two transmissions per PDU are required for the CgN to have an opportunity to assist.

57. The method as in any preceding embodiment wherein a Node B does not issue a new grant to a primary wireless transmit receive unit (WTRU) until the CgN completes using the spectrum opportunities earned during assistant.

58. The method as in any preceding embodiment, further comprising:
transmitting a NACK and not providing a new grant on a condition that a primary wireless transmit receive unit (WTRU) has successfully received data.

59. The method as in embodiment 58 wherein the grant is provided to the CgN.

60. The method as in any preceding embodiment, further comprising:
utilizing a special ACK on a condition that a primary wireless transmit receive unit (WTRU) is in a semi-persistent grant mode.

61. The method as in any preceding embodiment, further comprising:
modifying a grant to a primary wireless transmit receive unit (WTRU) to carry a new value that define's a minimum retransmission allocation.

62. The method as in embodiment 61 wherein the new value defines a number of attempts before a successful transmission.

63. The method as in any of embodiments 61-62 wherein the new value is used to signal the primary WTRU a minimum time interval required between subsequent first transmission data.

64. The method as in any preceding embodiment wherein the CgN uses a special ACK to determine a number of spectrum access opportunities the CgN has to send data.

65. The method as in any preceding embodiment, further comprising:
performing uplink cell edge enhancement.

66. The method as in any preceding embodiment, further comprising:
operating in a TTI bundling mode.

67. The method as in embodiment 66 wherein while in the TTI bundling mode, a primary wireless transmit receive unit (WTRU) transmits coded information over four consecutives TTIs on a condition that the primary WTRU receiver an uplink grant.

68. The method as in any of embodiments 65-67 wherein a secondary WTRU is camped in a cell announcing to a Node B that the secondary WTRU has capabilities and location information to assist a primary WTRU.

69. The method as in embodiment 68 wherein the primary WTRU is operating at a cell edge and uplink performance is degrading.

70. The method as in any of embodiments 68-69 wherein the Node B detects that the primary WTRU requires an uplink enhancement.

71. The method as in any of embodiments 68-70 wherein the Node B advertises on a MARCH that a primary WTRU requires assistance.

72. The method as in any of embodiments 68-71 wherein the Node B pages secondary WTRU requesting assistance.

73. The method as in any of embodiments 68-72 wherein the secondary WTRU accepts and sends intention to the Node B to assist primary WTRU.

74. The method as in any of embodiments 68-73 wherein a Node B determines whether the secondary WTRU can assist the primary WTRU.

75. The method as in embodiment 74 wherein on a condition that the determination is positive, the Node B informs the secondary WTRU of the identity of the primary WTRU including the configured radio network temporary identifier (RNTI) and the reward in a TTI.

76. The method as in any of embodiments 68-75 wherein the secondary WTRU connects with the primary WTRU and the secondary WTRU starts monitoring uplink grant for radio network temporary identifier (RNTI) on the physical downlink control channel (PDCCH).

77. The method as in any of embodiments 68-76 wherein the secondary WTRU decodes uplink grant for primary WTRU at a subframe_a.

78. The method as in any of embodiments 68-77 wherein at a subframe_a+4, the primary WTRU transmits coded information and the secondary WTRU decodes coded information based on the grant received.

79. The method as in any of embodiments 68-78 wherein at a subframe a+4+k, the secondary WTRU transmits information that was received from the primary WTRU using a replica of the grant received at a subframe_a, k is a predetermined value agreed between the secondary WTRU and the Node B.

80. The method as in any of embodiments 68-79 wherein at a subframe a+4+k+l, the secondary WTRU transmits information originated using a replica of the grant received at subframe_a, l is predetermined valued agreed between secondary WTRU and the Node B.

81. A wireless transmit receive unit (WTRU) configured to perform a method as in at least part of any one of embodiments 1-80.

82. The WTRU of embodiment 81, further comprising a transceiver.

83. The WTRU as in any of embodiments 81-82, further comprising a processor in a communication with a transceiver.

84. The WTRU as in any of embodiments 81-83 wherein a processor is configured to perform a method as in any of embodiments 1-80.

85. A Node B configured to perform at least part of a method as in any of embodiments 1-80.

86. The Node B as in embodiment 85, wherein the Node B is an evolved node B (eNB).

87. An integrated circuit configured to perform the method as in any one of embodiments 1-80.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for obtaining use of secondary cellular spectrum by a secondary wireless transmit receive unit (WTRU), the method comprising:
receiving information from a base station regarding a set of primary WTRUs needing assistance;
determining whether to provide assistance to a primary WTRU from the set of primary WTRUs;
in response to a determination to provide assistance, performing cooperative communications with a selected primary WTRU from the set of primary WTRUs to assist the selected primary WTRU with first data transmitted from the selected primary WTRU to the base station; and
on a condition that the assistance results in the first data being transmitted from the selected primary WTRU to the base station at a higher data rate than the first data would have been transmitted without the assistance, the secondary WTRU utilizing uplink resources originally intended for the selected primary WTRU for transmitting second data transmitted from the secondary WTRU to the base station.

2. The method of claim 1 wherein the determination to provide assistance is based on measurements performed at the secondary WTRU.

3. The method of claim 1 wherein the determination to provide assistance is based on information provided to the secondary WTRU by the network.

4. The method of claim 1 wherein the utilizing uplink resources is done in response to receiving a grant at the secondary WTRU.

5. The method of claim 1 wherein performing a relay function at the secondary WTRU includes establishing a first radio bearer for transmission of the data associated with the selected primary WTRU; and establishing a second radio bearer for transmission of data associated with the secondary WTRU.

6. A secondary wireless transmit receive unit (WTRU) for obtaining use of secondary cellular spectrum, the WTRU comprising:
a receiver configured to receive information from a base station regarding a set of primary WTRUs needing assistance;
a processor configured to determine whether to provide assistance to a primary WTRU from the set of WTRUs, and in response to a determination to provide assistance, perform cooperative communications with a selected primary WTRU for transmission of first data associated with the selected primary WTRU to the base station; and
a transmitter configured to, on a condition that the assistance results in the first data being transmitted to the base station at a higher data rate than the first data would have been transmitted without assistance, transmit second data associated with the secondary WTRU on uplink resources originally intended for the selected primary WTRU.

7. The secondary WTRU of claim 6 wherein the processor is configured to determine whether to provide assistance based on measurements performed at the secondary WTRU.

8. The secondary WTRU of claim 6 wherein the processor is configured to determine whether to provide assistance based on information provided to the secondary WTRU by the network.

9. The secondary WTRU of claim 6 wherein the transmitter is configured to transmit data relating to the secondary WTRU in response to receiving a grant at the secondary WTRU.

10. The WTRU of claim 6 wherein the processor is further configured to establish a first radio bearer for transmission of the data associated with the selected primary WTRU, and establish a second radio bearer for transmission of data associated with the secondary WTRU.

\* \* \* \* \*